(12) United States Patent
Wooters

(10) Patent No.: US 9,418,652 B2
(45) Date of Patent: *Aug. 16, 2016

(54) AUTOMATED LEARNING FOR SPEECH-BASED APPLICATIONS

(71) Applicant: Next IT Corporation, Spokane, WA (US)

(72) Inventor: Charles C Wooters, Sunnyvale, CA (US)

(73) Assignee: Next IT Corporation, Spokane Valley, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/610,891

(22) Filed: Jan. 30, 2015

(65) Prior Publication Data
US 2015/0213795 A1    Jul. 30, 2015

Related U.S. Application Data

(63) Continuation of application No. 12/584,770, filed on Sep. 11, 2009, now Pat. No. 8,949,124.

(60) Provisional application No. 61/096,095, filed on Sep. 11, 2008.

(51) Int. Cl.
*G10L 15/26* (2006.01)
*G10L 15/08* (2006.01)
(Continued)

(52) U.S. Cl.
CPC ............... *G10L 15/08* (2013.01); *G10L 15/22* (2013.01); *G10L 15/26* (2013.01); *G10L 15/18* (2013.01); *G10L 2015/0638* (2013.01); *G10L 2015/223* (2013.01)

(58) Field of Classification Search
CPC ........ G10L 15/063; G10L 15/22; G10L 15/18
USPC ...................................... 704/235, 9
See application file for complete search history.

(56) References Cited

U.S. PATENT DOCUMENTS 5,903,864 A   5/1999   Gadbois et al.
5,963,906 A   10/1999  Turin
(Continued)

OTHER PUBLICATIONS

Office action for U.S. Appl. No. 12/584,770, mailed on Nov. 25, 2013, Charles C. Wooters, "Automated Learning for Speech-Based Applications", 8 pages.

(Continued)

*Primary Examiner* — Jakieda Jackson
(74) *Attorney, Agent, or Firm* — Lee & Hayes, PLLC

(57) ABSTRACT

Systems and methods for modifying a computer-based speech recognition system. A speech utterance is processed with the computer-based speech recognition system using a set of internal representations, which may comprise parameters for recognizing speech in a speech utterance, such as parameters of an acoustic model and/or a language model. The computer-based speech recognition system may perform a first task in response to the processed speech utterance. The utterance may also be provided to a human who performs a second task based on the utterance. Data indicative of the first task, performed by the computer system, is compared to data indicative of a second task, performed by the human in response to the speech utterance. Based on the comparison, the set of internal representations may be updated or modified to improve the speech recognition performance and capabilities of the speech recognition system.

19 Claims, 3 Drawing Sheets

(51) Int. Cl.
*G10L 15/22* (2006.01)
*G10L 15/06* (2013.01)
*G10L 15/18* (2013.01)

(56) References Cited

U.S. PATENT DOCUMENTS

| | | |
|---|---|---|
| 6,219,643 B1 | 4/2001 | Cohen et al. |
| 6,260,013 B1 | 7/2001 | Sejnoha |
| 6,405,170 B1 | 6/2002 | Phillips et al. |
| 6,606,598 B1 | 8/2003 | Holthouse et al. |
| 6,754,627 B2 | 6/2004 | Woodward |
| 6,789,062 B1 | 9/2004 | Phillips et al. |
| 7,181,392 B2 | 2/2007 | Gandhi et al. |
| 7,263,489 B2 | 8/2007 | Cohen et al. |
| 7,444,286 B2 | 10/2008 | Roth et al. |
| 8,677,377 B2 | 3/2014 | Cheyer et al. |
| 2002/0013709 A1 | 1/2002 | Ortega et al. |
| 2002/0152071 A1 | 10/2002 | Chaiken et al. |
| 2003/0182121 A1 | 9/2003 | Hwang |
| 2004/0181407 A1 | 9/2004 | Trinkel et al. |
| 2004/0199384 A1 | 10/2004 | Hong |
| 2005/0119886 A1 | 6/2005 | Walker |
| 2005/0137866 A1 | 6/2005 | Dow et al. |
| 2005/0192992 A1 | 9/2005 | Reed et al. |
| 2006/0149558 A1* | 7/2006 | Kahn .................. G10L 15/063 704/278 |
| 2007/0106507 A1 | 5/2007 | Charoenruengkit et al. |
| 2008/0114596 A1 | 5/2008 | Acero et al. |
| 2008/0243504 A1 | 10/2008 | Poi |
| 2009/0228264 A1 | 9/2009 | Williams et al. |

OTHER PUBLICATIONS

Final Office Action for U.S. Appl. No. 12/584,770, mailed on Apr. 27, 2012, Charles C. Wooters, "Automated Learning for Speech-Based Applications", 10 pages.
Final Office Action for U.S. Appl. No. 12/584,770, mailed on Jun. 5, 2014, Charles C. Wooters, "Automated Learning for Speech-Based Applications", 8 pages.

* cited by examiner

AUTOMATED LEARNING FOR SPEECH-BASED APPLICATIONS

RELATED APPLICATIONS

This application is a continuation of and claims priority to U.S. patent application Ser. No. 12/584,770, filed on Sep. 11, 2009, which claims priority to U.S. provisional application Ser. No. 61/096,095, filed on Sep. 11, 2008, entitled "Automated learning for speech-based applications," all of which are incorporated by reference herein in their entirety.

BACKGROUND

The field of automated speech interpretation is in increasingly higher demand. The use of automated speech interpretation is becoming progressively more common in a variety of applications. Examples of speech-based applications include automated call centers or automated operators. Automated call centers may service telephone calls from customers regarding products or services, for example. Instead of speaking with a "live" customer service agent, the caller may be instructed to respond to automated prompts or questions by speaking the answer. In some cases, the caller may engage in a dialogue with a computer interface. During the call, the application interprets the speech utterances of the caller and may then access relevant information, such as account balances, flight times, or the like. By using automated speech recognition systems, the call center can rely on fewer "live" customer service agents to perform services for the callers, thereby reducing numerous personnel issues.

Automated speech recognition systems often rely on a set of internal representations to interpret the incoming speech utterances. These internal representations provide the framework for the speech-based application to respond to the utterances. For example, the internal representations may instruct the speech-based application how to interpret different words, phrases, content, or pauses of the utterances. Based on the interpretation, the speech-based application may take an action, such as retrieve a billing history or access a company directory. In order to accurately interpret the utterances, the internal representations are typically updated on an ongoing basis as more utterances are received and the results reviewed. By updating the internal representations, the performance of the speech-based application may be improved.

One method for improving the performance of a speech-based application is to employ a human "expert," or team of experts, to review the behavior of the application and subsequently modify the internal representations in order to improve its performance. For instance, the human may examine the utterances provided to the application and then examine the associated output or action taken by the speech-based application in response to the utterance. Through analysis, the human can determine what changes or modifications need to be made to the internal representations in order to improve performance and accuracy. The human can then manually make adjustments to the internal parameters to modify the behavior of the system.

Such techniques used to improve the accuracy of the application require the human acquire a certain, and often a high, level of knowledge about the operation of the system in order to make the required adjustments. This process may also be time consuming and labor intensive. Additionally, since the internal representations, or "models," of the speech-based application typically are based on statistics collected from sample data, one of the obstacles to deploying a speech-based application is the collection of sufficient data in order to build accurate models.

SUMMARY

In one general aspect, the present invention is directed to systems and methods for modifying a computer-based speech recognition system. According to various embodiments, the method comprises the step of receiving, by the computer-based speech recognition system, a speech utterance, such as via a telephone call or by other means. The method may further comprise the step of processing the speech utterance with the computer-based speech recognition system using a set of internal representations for the computer-based speech recognition system. The set of internal representations may comprise parameters for recognizing speech in a speech utterance, such as parameters of an acoustic model and/or a language model. The method may further comprise the step of performing, by computer-based speech recognition system, a first task in response to the processed speech utterance. The utterance may also be provided to a human who performs a second task based on the utterance. Data indicative of the first task, performed by the computer system, is compared to data indicative of a second task, performed by the human in response to the speech utterance. Based on the comparison, the set of internal representations may be updated or modified to improve the speech recognition performance and capabilities of the speech recognition system.

FIGURES

Various embodiments of the present invention are described herein by way of example in conjunction with the following figures, wherein.

DESCRIPTION

Figure 1:
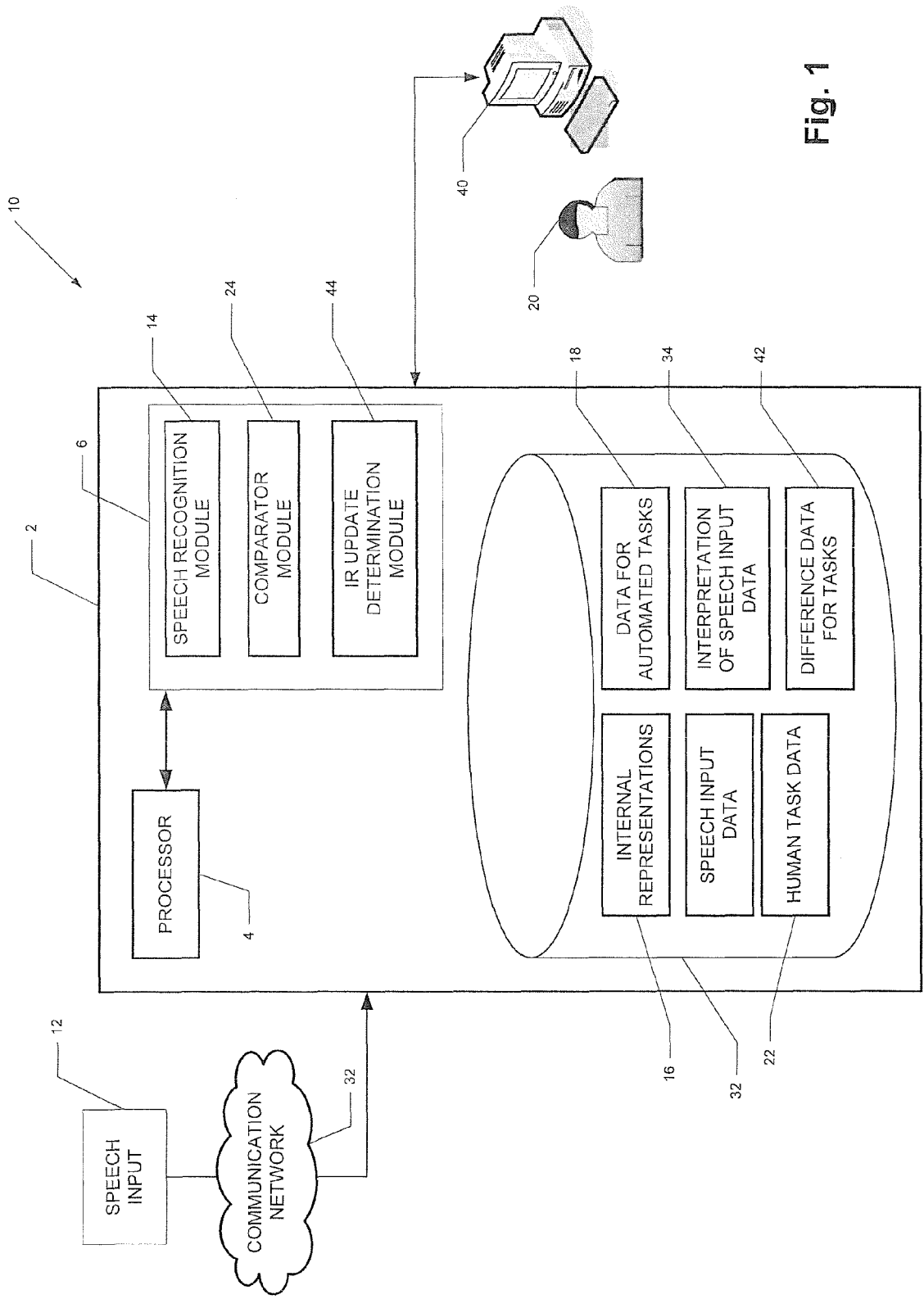
FIG. 1-2 are block diagrams in accordance with various embodiments of the present invention.

FIG. 1 illustrates an automated speech-based computer system 10 in accordance with one embodiment of the present invention. One skilled in the art may recognize that the various functional blocks of the speech-based computer system 10 can be implemented using a variety of technologies and through various hardware and software configurations. As such, the blocks shown in FIG. 1 are not meant to indicate separate circuits, modules, or devices or to be otherwise limiting, but rather to show the functional features and components of the system.

As illustrated in FIG. 1, the system 10 may comprise one or more networked computing devices 2 that comprise one or more processors 4 and one or more memory units 6. For convenience, only one computer device 2, one processor 4, and one memory unit 6 is shown in FIG. 1, and the following description describes embodiments as only having one computer device 2, one processor 4, and one memory unit 6, although it should be recognized that the invention is not so limited. The computer device 12 may computer servers or other types of computer devices. The memory 6 may store software to be executed by the processor. The memory unit 6 may comprise primary and/or secondary storage device of the computer device 2. The primary storage devices may comprise semiconductor and/or magnetic memory devices, such as read only memory (ROM), random access memory (RAM), and forms thereof. The secondary storage devices may comprise mass storage devices, such as magnetic hard disk drives and/or optical disk drives.

As illustrated in FIG. 1, the memory unit 6 may comprise a speech recognition module 14, a comparator module 24, and an IR (internal representation) update determination module 44. The modules 14, 24, 44 may be implemented as software code to be executed by the processor 4 of the computer device 2 using any suitable computer language, such as, for example, Java, C, C++, or Perl using, for example, conventional or object-oriented techniques. The software code may be stored as a series of instructions or commands on a computer-readable medium, such as a memory 6, which may be embodied as read-only memory (ROM), a magnetic medium such as a hard drive or a floppy disk, and/or an optical medium, such as a CD-ROM or DVD-ROM.

The speech recognition module 14 comprises software that, when executed by the processor 4, causes the processor to automatically process a speech input 12 received by the computer system 2. More details regarding possible implementations for the speech recognition module 14 are provided below. The comparator module 24 comprises software that, when executed by the processor 4, causes the processor to automatically determine differences between a task(s) performed by the computer system 2 in response to the speech input and a task(s) performed by a human 20 in response to the speech input. The IR update determination module 44 comprises software that, when executed by the processor 4, causes the processor to automatically determine adjustments to be made to the internal representations 16 for the speech recognition module 14 based on the differences detected by the comparator module 24 between a task(s) performed by the computer system 2 in response to the speech input and a task(s) performed by a human 20 in response to the speech input.

The speech input 12 may comprise a series of verbal utterances from a human or an automated audio output device transmitted, for example, during a telephone call. In such embodiments, the speech input 12 may be received by the computer system 2 via a communication network 30. The communication network 30 may comprise the public switched telephone network (PSTN) and/or packet-switched networks (such as for VoIP calls). It is appreciated, however, that the speech input 12 is not limited to utterances provided during telephone calls. For example, the speech input 12 could be received through a microphone, such as a microphone on a computer or in a vehicle (such as an automobile or airplane), or any other system utilizing voice recording or capturing technology. In addition, data for the speech input 12 may be transmitted in a computer data file to computer system 2 via the network 30.

The computer system 2 receives the utterances from the speech input 12 and the processor 4, executing the instructions of the speech recognition module 14, may process the utterances based on a set of internal representations 16. The internal representations 16 may be stored digitally in a machine readable format accessible to the speech recognition module 14. For example, the internal representations 16 may be stored in a computer database 32 stored in a primary and/or secondary storage device of the computer system 2. Through processing, the speech recognition module 14 may determine the content of the utterance of the speech input 12 and perform an automated task based on the content of the speech input 12. For example, the automated task may include accessing data or files stored in the computer database 32 (or some other computer database), such as account information, flight information, an employee directory, etc. The automated task may also comprise opening a file stored in the primary and/or secondary storage devices, inputting information into a GPS system, creating an electronic file (such as a text file or document) that contains a transcription of the speech input 12, or any other applicable task. It is appreciated that in various embodiments the speech recognition module 14 may perform a series of tasks depending on the content of the speech input 12.

In various embodiments, data representative of the speech input 12 and data regarding the corresponding automated task 18 may be archived or stored in the database 32 (or some other database). In some implementations, the recording, or logging, of the speech input 12 and corresponding automated tasks 18 continues as long as the speech-based system 2 is running. The information, such as the speech input 12 and corresponding automated task 18, may be stored in a log file, database, or any other suitable storage means of the computer system 2. The module's 14 interpretation 34 of the content of the speech input 12 may be stored or logged as well in the database 32 (or some other database).

According to various embodiments, in order to analyze whether the task is appropriate given the speech input 12, and to determine whether modifications to the representations 16 are needed, the speech input 12 also is provided to a human 20 for processing. The speech input 12 may be provided to the human 20 in any acceptable format. For example, a recording (analog or digital) of the speech input 12 may be played for the human 20 by an electronic audio player of the human that is in communication with the system 2 via a network (such as an electronic audio player of a computer device 40 operated by the human 20). In various embodiments, the speech input 12 may be played for the human 20 in "real time" as the speech input 12 is delivered to the speech recognition module 14. In other embodiments, the speech input 12 may be provided later to the human 20, that is, after being processed by the speech recognition module 14. In such cases, a recording of the speech input 12 may be stored in the database 32 of the system 2 and played for the human 20 later. In various embodiments, the speech input 12 from numerous callers may be played for one or more humans 20. It is also appreciated that speech inputs 12 from a variety of callers, such as callers of various dialects and from various geographic locations, may be provided to the human(s) 20.

Once the speech input 12 is provided to the human 20, the human 20 listens to the speech input and performs a human task, or series of tasks, in response to the content of the speech input 12. That is, for example, the speech input 12 may request one or more actions, and the human may be performs the tasks requested by the speech input 12. Data regarding the tasks 22 performed by the human 20 may be stored in the database 32 or some other computer database. Preferably, the human has no knowledge of the corresponding automated task 18 performed by the speech recognition module 14 of the computer system 2 in response to the speech input 12. The human 20 may be provided with the speech input 12 from an entire call, or the human 20 may be provided with discrete portions of the speech input 12 of a call.

Similar to the automated task 18, the human task 22 may include accessing data in a database, such as account information, flight information, an employee directory, etc., or opening a file stored in memory, inputting information into a GPS, transcribing the speech input, or any other applicable task. It is also appreciated, that the same speech input 12 may be provided to a plurality of humans 20, who all may perform a task in response to the content. In such embodiments, data indicative of the tasks 22 performed by each of the humans 20 in response the speech input 12 may be stored in a the database 32.

For a speech input, there will be data 18 indicative of the task(s) performed by the speech recognition module 14 of the computer system 2 and data 22 indicative of the task(s) performed by the human 20. In various embodiments, the output of automated task 18 is compared to the corresponding output of the human task 22 by the processor 4, executing the software instructions of the comparator module 24. When executing the code of the comparator module 24, the processor 4 may compare the automated task 18 performed in response to a particular speech input 12 to a human task 22 performed in response to the same speech input 12. Also, where multiple tasks are performed in response to the speech input 12, the comparator module 24 may compare a series of automated tasks 18 to a series of human tasks 22. Using standard analytic techniques, any differences between the human task 22 and the automated task 18 may be determined by the comparator module. Data 42 indicative of the differences detected by the comparator module 24 may be logged or archived, such as in the database 32 or some other database.

In various embodiments, the comparator module 24 will use the output of the human task 22 as the "correct" response to the speech input 12 and will ascertain the differences to the output of the automated task 18. For example, the output of automated task 18 may comprise a transcription of the speech input 12. The output of the human task 22 may comprise a similar transcript of the speech input 12. The comparator module 24 may then process the two transcripts and determine any differences between the transcripts that may exist.

In various implementations, a variety of outputs from the automated task 18 and the human task 22 may be compared. For example, the outputs from the tasks may include flight schedules retrieved, information given to the caller, or any other applicable output. Any difference between the output of the human task 22 and the automated task 18 may be viewed as a misinterpretation of the speech input 12 by the speech recognition module 14. After the differences between the outputs of the automated task 18 and the human task 22 are ascertained, updates to the parameters of the internal representations 16 may be determined by the IR update determination module 44, which may determine the updates, adjustments, and/or modifications to the internal representations 16 based in the differences detected by the comparator module 24 between a task(s) performed by the computer system 2 in response to the speech input and a task(s) performed by a human 20 in response to the speech input 12 using any suitable statistical technique (such as support vector machines, neural networks, and/or linear disriminant analysis). The IR update determination module 44 may output to the updates to the internal representations 16, which may be modified based on the updates. During the updating process, for example, the statistics of acoustic models or other models used by the speech recognizer 14 may be updated.

Once the parameters, such as the internal representations 16, of the speech recognizer 14 have been updated, the performance of the computer system 10 should be closer to the performance of the humans. The cycle of comparing the output of the automated tasks 18 to the output of the human task 22 may continue for a period of time in order for the speech recognition module 14 continually to improve its performance and accuracy.

In various embodiments, before the internal representations 16 are updated, the computer system 2 may check the performance of the updated internal representations using input data to which the non-updated internal representations had performed identically, or within an acceptable margin of error, to the performance of the humans 20. If the updated internal representation still performs identically, or within an acceptable margin of error, then the updated internal representations may be installed. Using this iterative approach, degradation of the performance over time is reduced or eliminated. Furthermore, the input data for which the system originally misinterpreted may be re-interpreted using the updated internal representations to ensure the revisions to the parameters properly addressed the speech interpretation issues.

Figure 2:
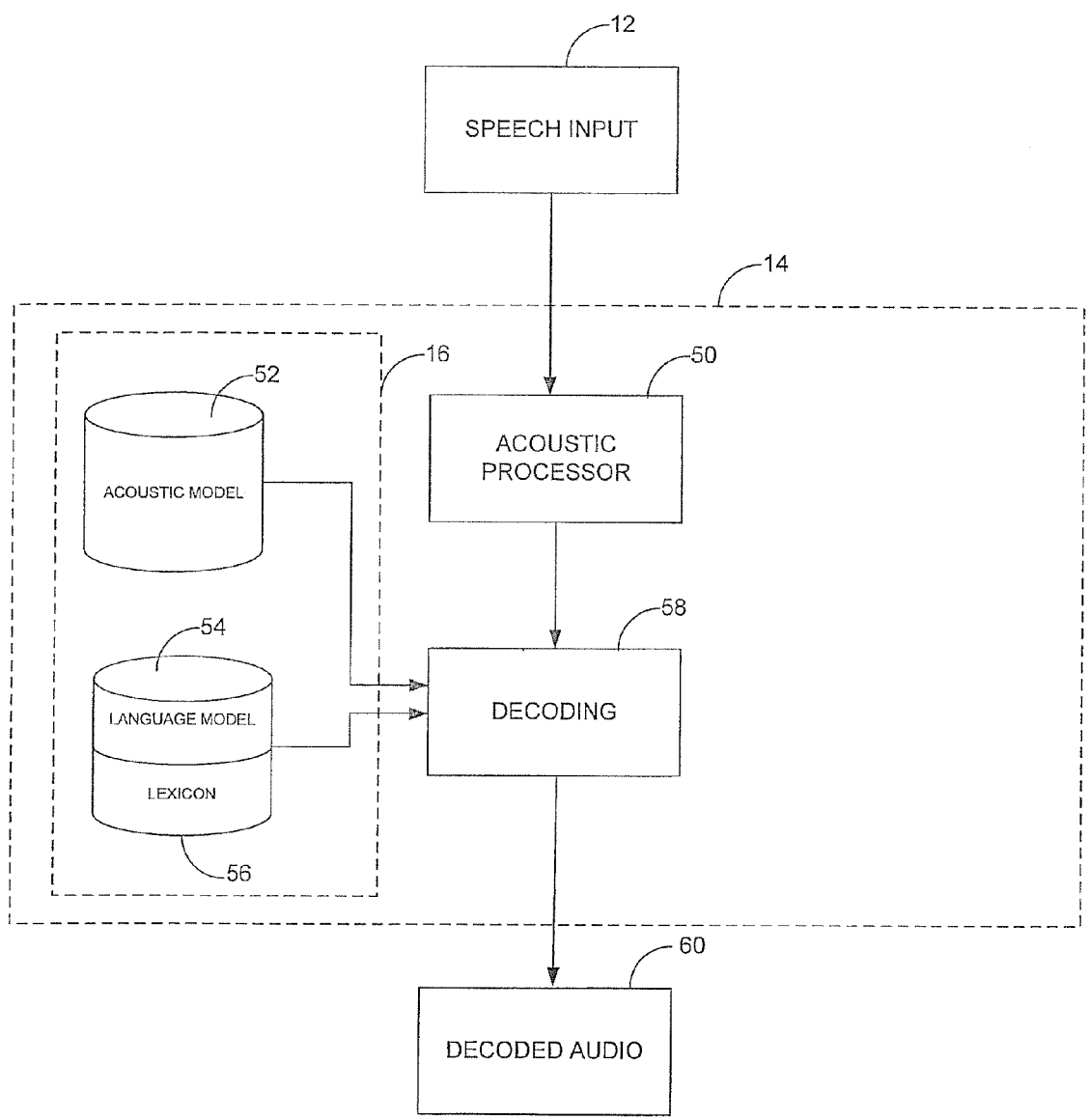

FIG. 2 is a functional diagram of the speech recognition module 14 according to various embodiments. As shown in the example of FIG. 2, the speech recognition module 14 may comprise an acoustic processor 50, an acoustic model 52, a language model 54, a lexicon 56, and a decoder 58. The acoustic model 52 may comprise statistical representations of the sounds that make up words, created by taking audio recordings of speech and their transcriptions, and compiling them into the statistical representations. The language model 54 may comprise a file (or files) containing probabilities of sequences of words. The language model 54 may also comprise a grammar file containing sets of predefined combinations of words. The lexicon 56 may be a file comprising the vocabulary of a language, e.g., words and expression. The acoustic processor 50 may process a received utterance to produce a decoded audio string based on the acoustic model 52, the language model 54, the lexicon 56, and the decoder 58. When the speech utterance is received, acoustic features in the speech are extracted from the speech signal and compared against the models in the acoustic model 52 to identify speech units contained in the speech signal. Once words are identified, the words are compared against the language model 54 to determine the probability that a word was spoken, given its history (or context).

The speech recognition module 14 may receive the speech input 12 and convert the caller's utterances in the call into a string of one or more words based on the configuration of the models in the system. The speech recognition module 14 may then provide a decoded audio string 60 as output, which may be stored as data 34 in the database 32. This decoded audio string output 60 may then be used to determine the appropriate automated task 18 that should be performed.

Figure 3:
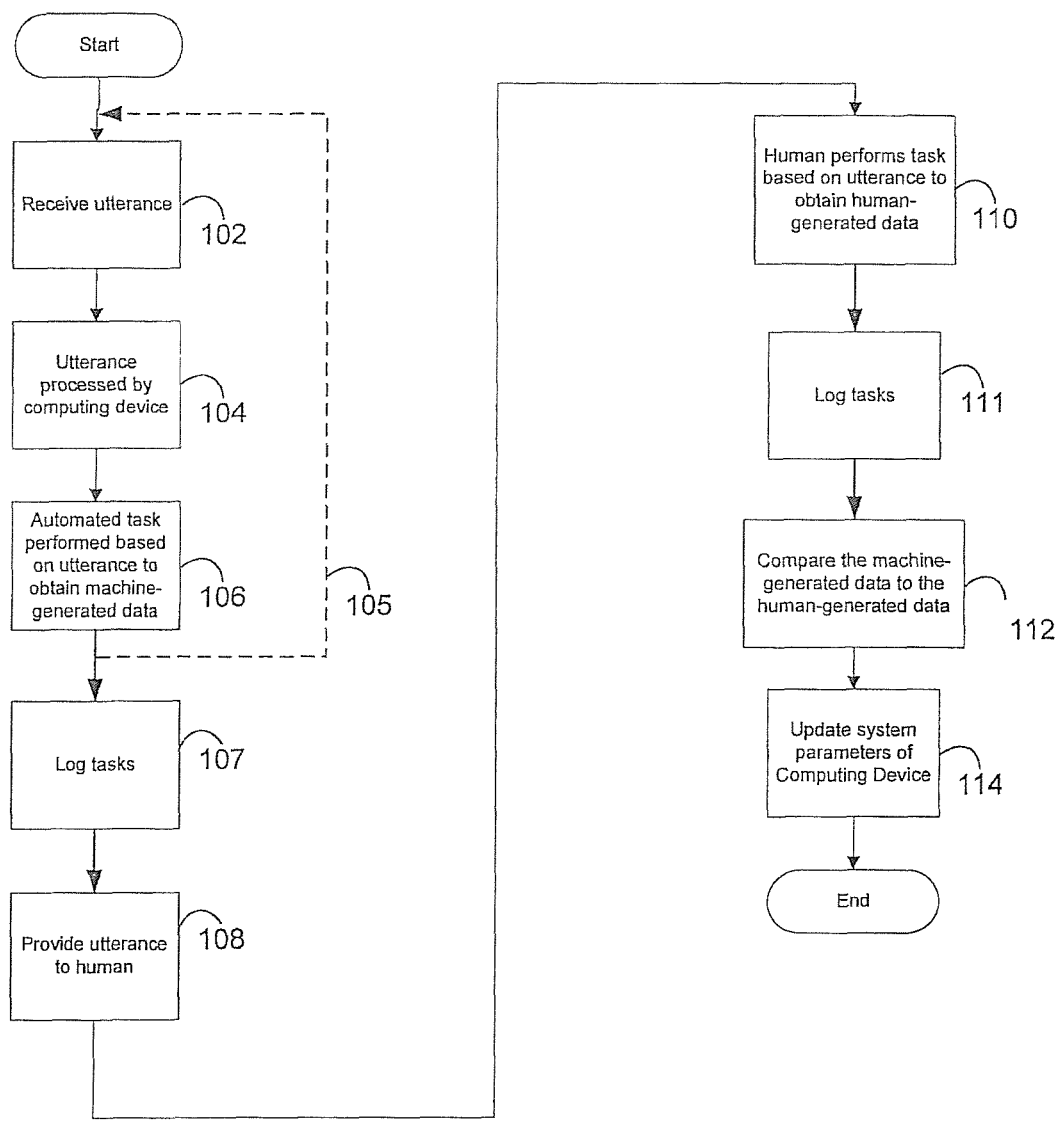
FIG. 3 is a flow chart in accordance with various embodiments of the present invention.

Referring now to FIG. 3, a flow chart in accordance with various embodiments is illustrated. An utterance is received at block 102. The utterance may be received, for example, during a call to a call center via a telephone network (such as a PSTN or VoIP network, for example). The utterance may be represented digitally or in analog form. If it is received in analog form, it may be digitized before processing. At block 104, the utterance is processed by computer device 2, including the speech recognition module 14. Once the utterance has been processed, an automated task is performed by the computer system 2 at block 106. As indicated by path 105, additional utterances may be received and processed, and automated tasks may be performed based on the processed utterances. As the tasks are performed, data regarding the machine-performed tasks may be captured, logged, and/or archived in the database 32 (block 107).

As shown in block 108, the utterance is also provided to a human 20. In various embodiments, a series of utterances may be provided to the human 20. The human performs a task, or series of tasks, based on the content of the utterances. Data indicative of the human-performed tasks are produced and may be stored, or logged, in any suitable storage medium (block 111), such as in the database 32. At block 112, the data indicative of the machine-performed tasks 18 for the utterance is compared to the data indicative of the human-performed tasks 22 for the utterance. The differences between the datasets may be indicative of misinterpretations of the utterances by the computing device 2 (e.g., the speech recognition module 14). As shown at block 114, using these differences (or errors), the system 2 (e.g., the IR update determination module 44) modifies the parameters used by the speech recognition module 14 of the computing device, such as one or more parameters of the acoustic model 52 and/or one or more parameters of the language model 54 of the speech recognition module.

As may be appreciated by those skilled in the art, various implementations of the above-described embodiments could be used in a variety of applications utilizing voice recognition technology, including, but not limited to: white pages and yellow pages lookups to find email addresses, telephone numbers, street addresses and other information for businesses and individuals; personal address book, calendars and reminders for each user; automatic telephone dialing, reading and sending emails and pages by voice and other communications control functions; map, location and direction applications; movie or other entertainment locator, review information and ticket purchasing; television, radio or other home entertainment schedule, review information and device control from a local or remote user; weather information for the local area or other locations; stock and other investment information including, prices; company reports, profiles, company information, business news stories, company reports, analysis, price alerts, news alerts, portfolio reports, portfolio plans; flight or other scheduled transportation information and ticketing; reservations for hotels, rental cars and other travel services; local, national and international news information including headlines of interest by subject or location, story summaries, full stories, audio and video retrieval and play for stories; sports scores, news stories, schedules, alerts, statistics, back ground and history information; ability to subscribe interactively to multimedia information channels, including sports, news, business, different types of music and entertainment, applying user specific preferences for extracting and presenting information; rights management for information or content used or published; horoscopes, daily jokes and comics, crossword puzzle retrieval and display and related entertainment or diversions; recipes, meal planning, nutrition information and planning, shopping lists and other home organization related activities; as an interface to auctions and online shopping, and where the system can manage payment or an electronic wallet; management of network communications and conferencing, including telecommunications, email, instant messaging, Voice over IP communications and conferencing, local and wide area video and audio conferencing, pages and alerts; location, selection, management of play lists and play control of interactive entertainment from local or network sources including, video on demand, digital audio, such as MP3 format material, interactive games, web radio and video broadcasts; organization and calendar management for families, businesses and other groups of users including the management of, meetings, appointments, and events; and interactive educational programs using local and network material, with lesson material level set based on user's profile, and including, interactive multimedia lessons, religious instruction, calculator, dictionary and spelling, language training, foreign language translation and encyclopedias and other reference material.

According to various embodiments, therefore, the present invention is directed to a method for modifying a computer-based speech recognition system. The method comprises the steps of: (a) receiving, by the computer-based speech recognition system, a speech utterance, wherein the computer-based speech recognition system comprises at least one computer device that comprises at least one processor and at least one memory device; (b) processing the speech utterance with computer-based speech recognition system using a set of internal representations for the computer-based speech recognition system, wherein the set of internal representations comprises one or more parameters for recognizing speech in a speech utterance; (c) performing, by computer-based speech recognition system, a first task in response to the processed speech utterance; (d) comparing data indicative of the first task to data indicative of a second task, wherein the second task is performed by a human in response to the speech utterance; and (e) modifying, by the computer-based speech recognition system, the set of internal representations based on the comparison.

In addition, according to other embodiments, the present invention is directed to a computer-based speech recognition system. The system comprises at least one computer device. The computer device comprises at least one processor and at least one memory device. The at least one memory device stores instructions that when executed by the at least one processor cause the at least one processor to: (a) process a speech utterance received by the computer-based speech recognition system using a set of internal representations for the computer-based speech recognition system, wherein the set of internal representations comprises one or more parameters for recognizing speech in a speech utterance; (b) perform a first task in response to the processed speech utterance; (c) compare data indicative of the first task to data indicative of a second task, wherein the second task is performed by a human in response to the speech utterance; and (d) modify the set of internal representations of the computer-based speech recognition system based on the comparison.

According to various implementations, the speech utterance is received as part of a telephone call. In addition, the computer-based speech recognition system may comprise a speech recognition module, and the internal representations comprise a parameter of an acoustic model and/or a parameter of the language model of the speech recognition module.

According to yet other embodiments, the present invention is directed to a computer readable medium having stored thereon instructions that when executed by a processor cause the processor to: (i) process a received speech utterance using a set of internal representations, wherein the set of internal representations comprises one or more parameters for recognizing speech in a speech utterance; (ii) perform a first task in response to the processed speech utterance; (iii) compare data indicative of the first task to data indicative of a second task, wherein the second task is performed by a human in response to the speech utterance; and (iv) modify the set of internal representations based on the comparison. In various implementations, the speech utterance is received as part of a telephone call. Also, the internal representations comprise a parameter of an acoustic model and/or a language model for recognizing speech.

As used herein, a "computer," "compute device," or "computer system" may be, for example and without limitation, either alone or in combination, a personal computer ("PC"), server-based computer, main frame, server, microcomputer, minicomputer, laptop, personal data assistant ("PDA"), cellular phone, processor, including wireless and/or wireless varieties thereof, and/or any other computerized device capable of configuration for receiving, storing, and/or processing data for standalone applications and/or over the networked medium or media.

In general, computer-readable memory media applied in association with embodiments of the invention described herein may include any memory medium capable of storing instructions executed by a programmable apparatus. Where applicable, method steps described herein may be embodied or executed as instructions stored on a computer-readable memory medium or memory media. These instructions may be software embodied in various programming languages such as C++, C, Java, and/or a variety of other kinds of software programming languages that may be applied to create instructions in accordance with embodiments of the invention. As used herein, the terms "module" and "engine" represent software to be executed by a processor of the computer system. The software may be stored in a memory medium.

While the present invention has been illustrated by description of several embodiments and while the illustrative embodiments have been described in considerable detail, it is not the intention of the applicant to restrict or in any way limit the scope of the appended claims to such detail. Additional advantages and modifications may readily appear to those skilled in the art.

What is claimed is:

1. A method comprising:
   receiving, by a computer-based speech recognition system, a speech input and a first task associated with the speech input, the first task being determined by processing the speech input using an original set of internal representations for the computer-based speech recognition system, the original set of internal representations comprising one or more parameters for recognizing speech in the speech input, the computer-based speech recognition system comprising at least one processor and at least one memory device;
   comparing the first task with a second task associated with the speech input, the second task being identified by a human in response to hearing the speech input;
   based at least in part on the comparison, modifying the original set of internal representations to create a modified set of internal representations;
   processing, by the at least one processor of the computer-based speech recognition system and based at least partly on the modified set of internal representations, the speech input to identify a third task for the speech input;
   comparing the third task to the second task to determine that the third task is within an acceptable margin of error to the second task;
   in response to determining that the third task is within an acceptable margin of error to the second task, replacing the original set of internal representations of the computer-based speech recognition system with the modified set of internal representations;
   receiving, by the computer-based speech recognition system, another speech input; and
   processing, by the at least one processor and based at least partly on the modified set of internal representations, the other speech input to identify a particular task for the other speech input.

2. The method of claim 1, wherein the third task is the same as the second task.

3. The method of claim 1, wherein the internal representations comprise statistical representations of sounds that make up words.

4. The method of claim 1, wherein the speech input is received as part of a voice communication.

5. The method of claim 1, wherein the original set of internal representations and the modified set of internal representations include a parameter of an acoustic model that is used by the computer-based speech recognition system.

6. The method of claim 1, wherein:
   the first task and the third task are machine transcriptions of the speech input; and
   the second task is a human transcription of the speech input.

7. The method of claim 1, further comprising:
   determining that the original set of internal representations misinterpreted the speech input when processing the speech input to determine the first task.

8. A system, comprising:
   one or more processors; and
   memory, communicatively coupled to the one or more processors, containing instructions that, when executed, configure the one or more processors to perform operations comprising:
   receiving a speech utterance and a first task for the speech utterance, the first task being determined by processing the speech utterance using an original set of statistical representations stored in the memory of the system, the original set of statistical representations comprising one or more parameters for recognizing speech in the speech utterance;
   comparing the first task with a second task for the speech utterance, the second task being identified by a human in response to hearing the speech utterance;
   based at least in part on the comparison, updating the original set of statistical representations to create an updated set of statistical representations;
   processing, with the updated set of statistical representations, the speech input to identify a third task for the speech utterance;
   comparing the third task to the second task to determine that the third task is within an acceptable margin of error to the second task;
   in response to determining that the third task is within an acceptable margin of error, replacing the original set of statistical representations of the system with the updated set of statistical representations;
   receiving another speech utterance; and
   processing, by the one or more processors and based at least partly on the updated set of statistical representations, the other speech utterance to identify a particular task for the other speech utterance.

9. The system of claim 8, wherein:
   the system comprises a speech recognition module; and
   the statistical representations include a parameter of an acoustic model of the speech recognition module.

10. The system of claim 9, wherein
    the system comprises a language model; and
    the language model includes probabilities of sequences of words.

11. The system of claim 9, wherein receiving the speech utterance further comprises:
    identifying one or more acoustic features contained in the speech utterance;
    extracting the one or more acoustic features contained in the speech utterance;
    comparing the one or more acoustic features with the parameter of the acoustic model of the speech recognition module to identify one or more words contained in the speech utterance; and
    comparing the one or more words with the probabilities of sequences of words of the language model to determine a probability that the one or more words were spoken, the determining being based at least in part on context of the sequence of words.

12. The system of claim 8, wherein the operations further comprise:
  determining that the original set of statistical representations misinterpreted the speech utterance when processing the speech utterance to determine the first task.

13. The system of claim 8, wherein the third task is the same as the second task.

14. The system of claim 8, wherein the speech utterance is received as part of a telephone call or other voice communication.

15. One or more non-transitory computer-readable storage media storing instructions that, when executed by one or more processors, configure the processor to perform acts comprising:
  identifying a speech input and a first task associated with the speech input, the first task being determined by processing the speech input using an original set of internal representations of a computer-based speech recognition system, the original set of internal representations comprising one or more parameters for recognizing speech in the speech input;
  comparing the first task with a second task associated with the speech input, the second task being identified by a human in response to hearing the speech input;
  based at least in part on the comparison, modifying the original set of internal representations to create a modified set of internal representations;
  processing, by the one or more processors and using the modified set of internal representations, the speech input to identify a third task for the speech input;
  comparing the third task to the second task to determine whether the third task is within an acceptable margin of error to the second task;
  in response to determining that the third task is within an acceptable margin of error, replacing the original set of internal representations of the computer-based speech recognition system with the modified set of internal representations;
  receiving another speech input; and
  processing, by the one or more processors and using the modified set of internal representations, the other speech input to identify a particular task for the other speech input.

16. The one or more non-transitory computer-readable storage media of claim 15, wherein at least one of the first task or the second task comprises at least one of accessing account information, accessing flight information, accessing an employee directory, opening a file, or inputting GPS information.

17. The one or more non-transitory computer-readable storage media of claim 15, wherein:
  the first task and third task are a machine transcription of the speech input; and
  the second task is a human transcription of the speech input.

18. The one or more non-transitory computer-readable storage media of claim 17, wherein:
  comparing the first task with the second task comprises identifying differences between the machine transcription and the human transcription; and
  modifying the original set of internal representations to create a modified set of internal representations comprises adjusting the set of internal representations based on the identified differences.

19. The one or more non-transitory computer-readable storage media of claim 15, the acts further comprising:
  determining that the original set of statistical representations misinterpreted the speech input when processing the speech input to determine the first task.

\* \* \* \* \*